United States Patent
Smith et al.

(10) Patent No.: US 6,925,409 B2
(45) Date of Patent: Aug. 2, 2005

(54) SYSTEM AND METHOD FOR PROTECTION OF ACTIVE FILES DURING EXTREME CONDITIONS

(75) Inventors: Kevin H. Smith, Roseville, CA (US); Andrew H. Dickson, Fair Oaks, CA (US)

(73) Assignee: Hewlett-Packard Development Company, L.P., Fort Collins, CO (US)

( * ) Notice: Subject to any disclaimer, the term of this patent is extended or adjusted under 35 U.S.C. 154(b) by 157 days.

(21) Appl. No.: 10/264,022

(22) Filed: Oct. 3, 2002

(65) Prior Publication Data

US 2004/0068386 A1 Apr. 8, 2004

(51) Int. Cl.[7] .................................................. G01K 1/08
(52) U.S. Cl. ........................... 702/132; 714/15; 714/1; 714/2; 714/37; 714/47; 711/162; 711/161; 711/154
(58) Field of Search ........................... 702/132; 714/15, 714/1, 2, 37, 47; 711/162, 161, 154

(56) References Cited

U.S. PATENT DOCUMENTS

| 5,631,852 | A | | 5/1997 | Chen |
| 5,835,885 | A | | 11/1998 | Lin |
| 6,082,623 | A | | 7/2000 | Chang |
| 6,266,579 | B1 | * | 7/2001 | Baraty ........................ 700/275 |
| 6,286,106 | B1 | * | 9/2001 | Flannery ..................... 713/310 |
| 6,496,949 | B1 | * | 12/2002 | Kanevsky et al. ............ 714/47 |
| 6,518,878 | B1 | * | 2/2003 | Skoff ......................... 340/506 |
| 6,661,346 | B1 | * | 12/2003 | Wood et al. ................. 340/601 |
| 6,684,306 | B1 | * | 1/2004 | Nagasawa et al. .......... 711/162 |

* cited by examiner

Primary Examiner—John Barlow
Assistant Examiner—Anthony T. Dougherty
(74) Attorney, Agent, or Firm—Hewlett-Packard Company

(57) ABSTRACT

A system method for determining temperature anomalies that would affect the proper operation of a computer and, upon receipt of a determined temperature anomaly, causing certain data to be saved within a storage device in a file location appropriate for such data.

26 Claims, 2 Drawing Sheets

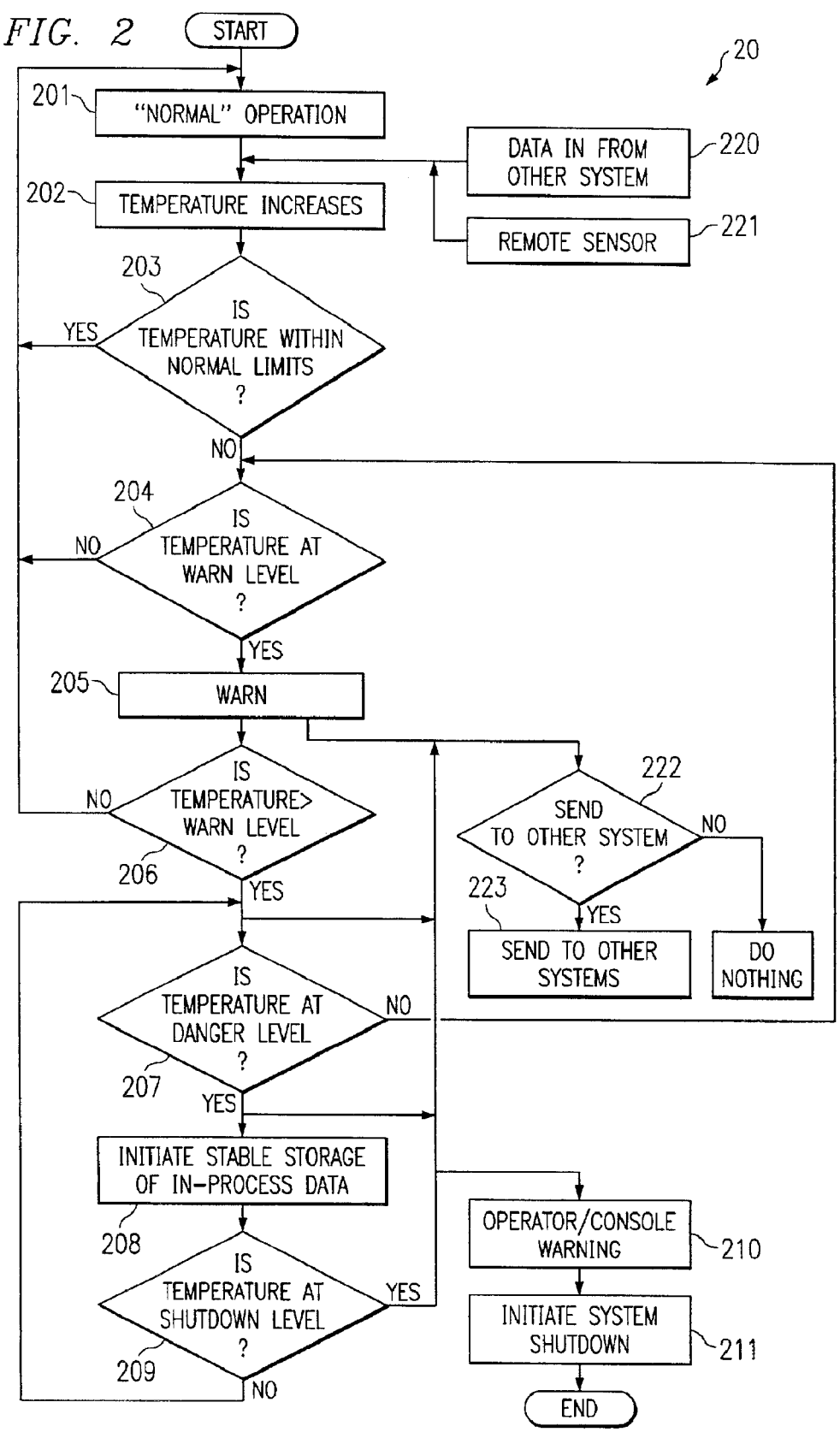

SYSTEM AND METHOD FOR PROTECTION OF ACTIVE FILES DURING EXTREME CONDITIONS

FIELD OF THE INVENTION

This invention relates to computer protection systems and methods and more particularly to such systems and methods which allow for the safe protection of currently active files during extreme conditions.

BACKGROUND OF THE INVENTION

In computer systems, there is always the possibility of a fire or other extreme temperature condition. Such extreme conditions can occur because of a problem internal to the computer, or they may occur as a result of events taking place outside the computer housing.

Regardless of where the high temperature event occurs, the results can be devastating to data being worked on by the computer. In a typical scenario, as the temperature rises, the computer's control system begins to sense a problem and reacts by trying to cool the equipment. This could, for example, be by running the cooling fan faster and faster. At some point, the internal control system cannot keep up with the cooling requirements for the computer and the system either turns off or continues to function until it becomes disabled. In either event, data that has not been stored is either lost or stored in a temporary file which then must be recovered when the system is restarted.

In some situations, the computer internal control, upon sensing a problem, signals a user so that the user may then take protective action. If this signaling is done too soon, the user is encouraged to take premature action when, in fact, no action would have been required. On the other hand, if the system waits too long to inform the user of a pending temperature problem, the user may not have enough time to react properly (or may react improperly) and valuable data will be lost. Also, in many situations, data is being worked on by a computer, or computer system, without the presence of a user. In such cases, notification of a pending trouble condition is of no effect.

BRIEF SUMMARY OF THE INVENTION

A computer system has incorporated therein at least one sensor for determining high temperature fault conditions that would affect the proper operation of the computer. Upon a determined high temperature fault condition, certain data is saved within a storage device in a file location appropriate for such data. If desired, the stored data, as well as any other data from the computer, can be saved at a location remote from the computer.

BRIEF DESCRIPTION OF THE DRAWINGS

FIG. 2 shows a flow chart of one embodiment of the invention.

DETAILED DESCRIPTION OF THE INVENTION

Figure 1:
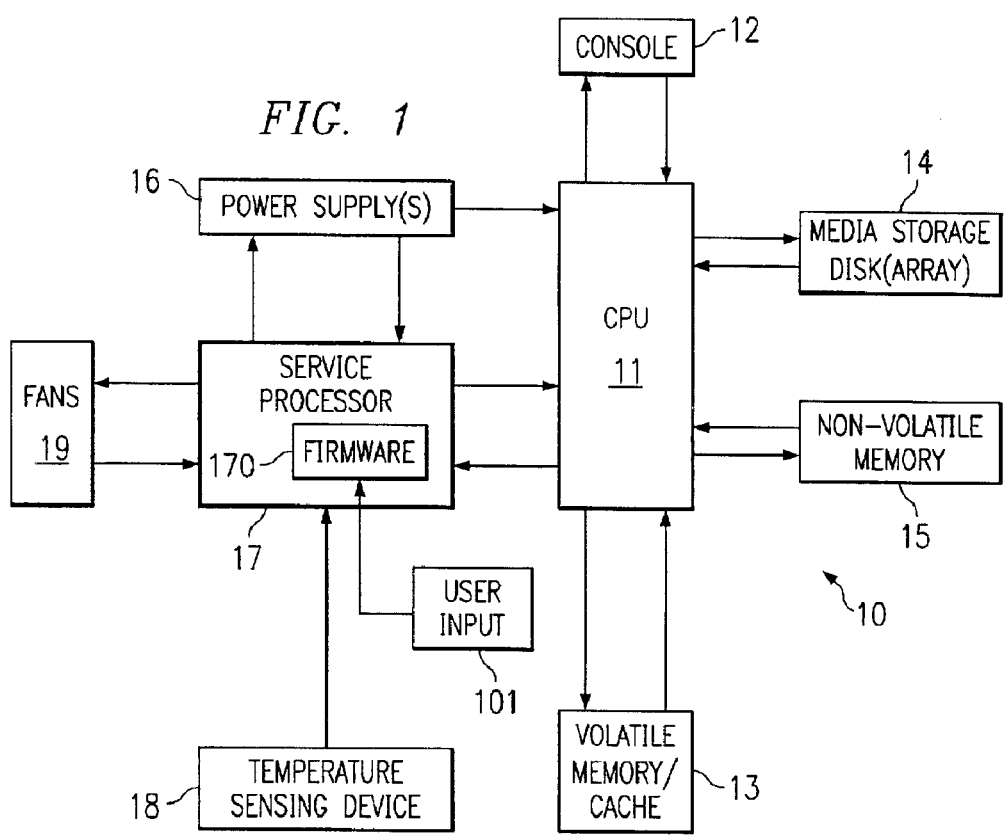
FIG. 1 shows one embodiment of the invention.

Turning now to FIG. 1 there is shown representative computer system 10, which includes CPU 11, console 12, volatile memory/cache 13, media storage 14, nonvolatile memory 15, one or more power supplies 16, service processor 17, which includes therein firmware 170, temperature sensing device 18 and fans 19.

It is noted this is a representative system and the invention could be utilized in any type of computer system, whether it be within a single housing or several housings. Also, the various portions of system 10, such as CPU 11, console 12 and memory storage 13, 14, 15, or any of the other portions, could be spread over several systems, either contained at the same location or remoted together via a network connection, such as the Internet, T1, T3 or even a wireless interconnection between different units.

Temperature sensing device 18 could be remote from the system and could, if desired, be a signal received from another system, perhaps physically co-located with the system. This signal from another system could be used as an 'early warning' signal to modify the operation of the system pending an anticipated rise in temperature Service processor 17 in the system shown is utilized to perform various functions on the operation of the system while main processor CPU 11 is processing data for one or more applications. Service processor 17, controlled in part by firmware 170, monitors various functions, for example, it can monitor the temperature as provided by temperature sensing device 18. Service processor 17 also monitors power supply(ies) 16 and could serve to control fans 19. User input 101 can be used, if desired, to set and change sensor levels; for example, as will be discussed with respect to boxes 203, 204, 206, 207 and 209 of FIG. 2.

Temperature sensing device 18 could be one or more transducers that pick up the actual temperature, or detect the rate of temperature rise, or detect products of combustion and would perform various functions, such as, for example, the calculations shown in U.S. Pat. No. 5,835,885, U.S. Pat. No. 5,631,852 or U.S. Pat. No. 6,082,623, all of which are incorporated herein by reference. The method of the identified patents can be run by temperature sensing device 18 and/or by service processor 17 and could be under control of firmware 170. If desired, the system and method of this invention could be run, in whole or in part, in CPU 11 directly.

In some operations, service processor 17 would monitor the temperature of the computer systems and would control fans 19 to keep the temperature under control within certain set limits. As will be discussed, when the temperature rate of rise, and/or actual temperature, or other device for determining that a problem exists, reaches a certain level, action will be taken to store in-process data in a proper non-volatile memory 14 or 15. In-process data could be defined as all (or a portion) of the data that is outside of a non-volatile memory. Or it can be defined as all of the data, at the time of the detected trouble condition, not in a certain memory device. The system can be designed to select one or more storage devices, some of which could be located remotely from the trouble site. The data could be stored in multiple such devices, if desired, and the selection could be based on the source, and/or the intensity of the heat.

During normal operation of the computer, CPU 11 causes one or more applications to be loaded into its active memory, for example, volatile memory/cache 13. CPU 11 would receive data, perhaps via console 12, or from other sources not shown, and would work on this data in accordance with a then active information. During processing, this data is sometimes stored in storage 14, 15, but most often stored in volatile memory/cache 13.

When a high temperature fault condition occurs, as will be discussed with respect to FIG. 2, several actions are taken under control of, in this embodiment, service processor 17 and firmware 170. These actions culminate with the in-process data being stored in a non-volatile (and ideally in a heat resistant) memory, such as memory 14 or 15. Under some conditions, CPU 11, as well as the rest of the equipment including power supply 16, fans 19 will be turned off to preserve their integrity for later use.

Turning to FIG. 2, there is shown one embodiment 20 that starts with normal computer operation 201. As the temperature increases, process 202, under control of temperature sensing device 18, or remotely from another system, box 220, or from remote sensor box 221 working in conjunction with service processor 17 in the embodiment of FIG. 1, a decision, box 203, will be made to determine if the temperature is within the normal limits. If it is, the operation continues. Temperature monitoring can be combined, or can be periodic, as desired. If at any time the temperature is not within normal limits, then the determination is made, via decision box 204, as to whether the temperature is at the warn level, if not, the system continues operating.

When operation 204 determines that the temperature has risen (or will rise) to a certain limit, a message (or other signal) is sent, box 205, to the user in one of various ways. A message can be put on the screen, or a message can be sent by wireline or wireless, including e-mail, to a user to warn the user that there is an impending problem. The message could be sent, as above-discussed, to another system, via boxes 222 and 223, if desired.

When the temperature moves above the warning level, decision box 206, a decision will then be made as to when the temperature is at the danger level, decision box 207. Until the temperature is at the danger level, the system continues to monitor the temperature, provide warnings (including, if desired, the actual current computer temperature) to the user, but no further action is taken.

Once the temperature rises to the danger level, then the system initiates a stable storage of the in-process data via procedure 208. The system continues to monitor the temperature and at the point when the temperature rises to a level where a shut-down must occur, decision box 209, such system shut-down is undertaken. When that occurs, the user is given a warning, via warning 210, similar to the warning previously given, but, at this time, the warning indicates to the user that the system is going to be shut down. Process 211 initiates the system shut-down so as to preserve the integrity of the system. As shown in FIG. 2, data can be sent to one or more other systems at various times to help control those systems.

Note that prior to this time, the in-process data had been stored in a non-volatile memory. This memory can be located within the housing, which is preferable, on a hard drive, alternatively, the data can be transmitted to a remote location via the Internet or other means, including wireless connections. The stored data could include, not only the in-process data, but certain other data that is desired to be preserved, based upon either the temperature's rate of rise or the fact that there is a fault condition that has occurred.

What is claimed is:

1. A computer system including:
   a sensor for determining temperature anomaly conditions that would affect the proper operation of said computer;
   a storage device; and
   a processor operable upon a determined temperature anomaly for causing certain data to be saved within said storage device in a file location appropriate for such data, wherein said processor is further operable to provide at least one warning to a user upon determination of a temperature anomaly condition less severe than the temperature anomaly that causes said certain data to be saved within said storage device.

2. The system of claim 1 wherein said sensor is networked with a plurality of computer systems.

3. The system of claim 1 wherein said sensor includes processing by said processor.

4. The system of claim 1 wherein said sensor can determine degrees of fault, and wherein said processor takes different action depending upon a determined fault degree.

5. The system of claim 1 wherein said computer further includes:
   a service processor working in conjunction with said processor, said service processor working in conjunction with said sensor to control the saving of said data.

6. The system of claim 1 wherein said sensor is located remote from said computer system.

7. The system of claim 6 wherein said remote sensor is at another computer system.

8. The system of claim 1 wherein said certain data includes in-process data.

9. The system of claim 8 wherein said storage device is within the same housing as said processor.

10. The system of claim 8 wherein said processor action is selected from the list of: notification of a user; internal storage of in-process data; external storage of in-process data; external storage of other data previously stored in said storage device.

11. A method for use in a computer system protecting in-process data in the event of a temperature anomaly; said method comprising the steps of:
   processing data in and out of a volatile memory;
   determining when said computer system is being subjected to a temperature anomaly;
   processing any said determined temperature anomaly to determine the level of severity of said determined temperature anomaly; and
   storing in a non-volatile memory any data not already stored in a non-volatile memory upon a determination that said determined temperature anomaly is of a certain severity level.

12. The method of claim 11 further including the step of receiving temperature anomaly data from a remote location.

13. The method of claim 11 further comprising the step of sending determined temperature anomaly data to at least one system remote from said computer system.

14. The method of claim 11 wherein said certain severity level is controllable by a user of said computer system.

15. The method of claim 11 further including the step of:
   providing at least one warning based on said determined severity.

16. The method of claim 11 wherein said determining step includes monitoring a transducer for one or more of the following events:
   absolute temperature, rate of temperature rise, comparison to outside temperature, comparison to prior operating temperatures, and monitoring of products of combustion.

17. The method of claim 11 further including the step of:
   closing down the operation of said computer system after said storing step dependent upon the severity of said anomaly.

18. The method of claim 11 further comprising:
   providing at least one warning to a user upon determination of said temperature anomaly having a level of severity less severe than the certain severity level.

19. The method of claim 11 wherein said storing step includes writing said in-process data to a hard drive.

20. The method of claim 19 wherein said hard drive is located within a housing wherein said processing step is performed.

21. A data recovery system for use in a computer system comprising:

means for determining when a temperature anomaly is occurring;

means operative in response to said determining means for storing in non-volatile storage any data not already in non-volatile storage, said storing being at a location appropriate for said data; and means for providing at least one warning to a user based upon determined ones of said anomalies, wherein said warning is provided upon determination of an anomaly less severe than the anomaly that enables said storing means.

22. The system of claim 21 further comprising means for transmitting temperature anomaly data to at least one remote location.

23. The system of claim 21 wherein said determining means includes:

at least one temperature-dependent transducer; and a processor for controlling said storing means in response to signals for said transducer.

24. The system of claim 23 wherein said transducer is selected from the following:

absolute temperature, rate of temperature rise, comparison to outside temperature, comparison to prior operating temperatures, and monitoring of products of combustion.

25. The system of claim 23 further including:

means operative in response to said determining means for closing down the operation of said computer system after said storing means is enabled.

26. The system of claim 23 wherein said temperature-dependent transducer is located remotely from said storage means.

* * * * *